(12) United States Patent
Ericson et al.

(10) Patent No.: US 6,836,555 B2
(45) Date of Patent: Dec. 28, 2004

(54) INFORMATION MANAGEMENT SYSTEM WITH AUTHENTICITY CHECK

(75) Inventors: Petter Ericson, Malmo (SE); Christer Fahraeus, Lund (SE); Linus Wiebe, Malmo (SE); Kristofer Skantze, Lund (SE)

(73) Assignee: Anoto AB, Lund (SE)

( * ) Notice: Subject to any disclaimer, the term of this patent is extended or adjusted under 35 U.S.C. 154(b) by 376 days.

(21) Appl. No.: 09/746,781

(22) Filed: Dec. 22, 2000

(65) Prior Publication Data

US 2003/0084002 A1 May 1, 2003

Related U.S. Application Data

(60) Provisional application No. 60/177,304, filed on Jan. 21, 2000.

(30) Foreign Application Priority Data

Dec. 23, 1999 (SE) .............................................. 9904746

(51) Int. Cl.[7] ................................................. G06K 9/00
(52) U.S. Cl. ....................... 382/116; 382/188; 382/201; 382/314
(58) Field of Search .......................... 382/116, 119–123, 382/188, 201, 314; 235/454; 283/75, 93, 58; 345/179, 166; 178/18.09, 19.01, 19.05; 341/13, 20

(56) References Cited

U.S. PATENT DOCUMENTS

| | | | | |
|---|---|---|---|---|
| 4,581,482 A | * | 4/1986 | Rothfjell | 128/18 |
| 5,067,162 A | * | 11/1991 | Driscoll, Jr. et al. | 382/5 |
| 5,107,541 A | * | 4/1992 | Hilton | 382/3 |
| 5,587,560 A | * | 12/1996 | Crooks et al. | 178/18 |
| 5,852,434 A | * | 12/1998 | Sekendur | 345/179 |

* cited by examiner

Primary Examiner—Brian Werner
(74) Attorney, Agent, or Firm—Birch, Stewart, Kolasch & Birch, LLP

(57) ABSTRACT

A payment product has a writing area (6c) which is intended for a user's signature. In the writing area there is a first position-coding pattern (5) which makes possible digital recording of the signature. The first position-coding pattern is a subset of a larger second position-coding pattern. The payment product is used in a payment system which is based on electronic payment information, which has been recorded by means of the position-coding pattern, being sent to a server unit, which utilizes the position-coding pattern to check that the payment information is valid.

39 Claims, 4 Drawing Sheets

| Region | Owner | Recipient | User | Signature | User identity |
|---|---|---|---|---|---|
| $(X_1Y_1); (X_2Y_2)$ $(X_3Y_3); (X_4Y_4)$ | The bank A | Bank@sek.s | Anders Andersson | *Anders Andersson* | 123 456 789 |

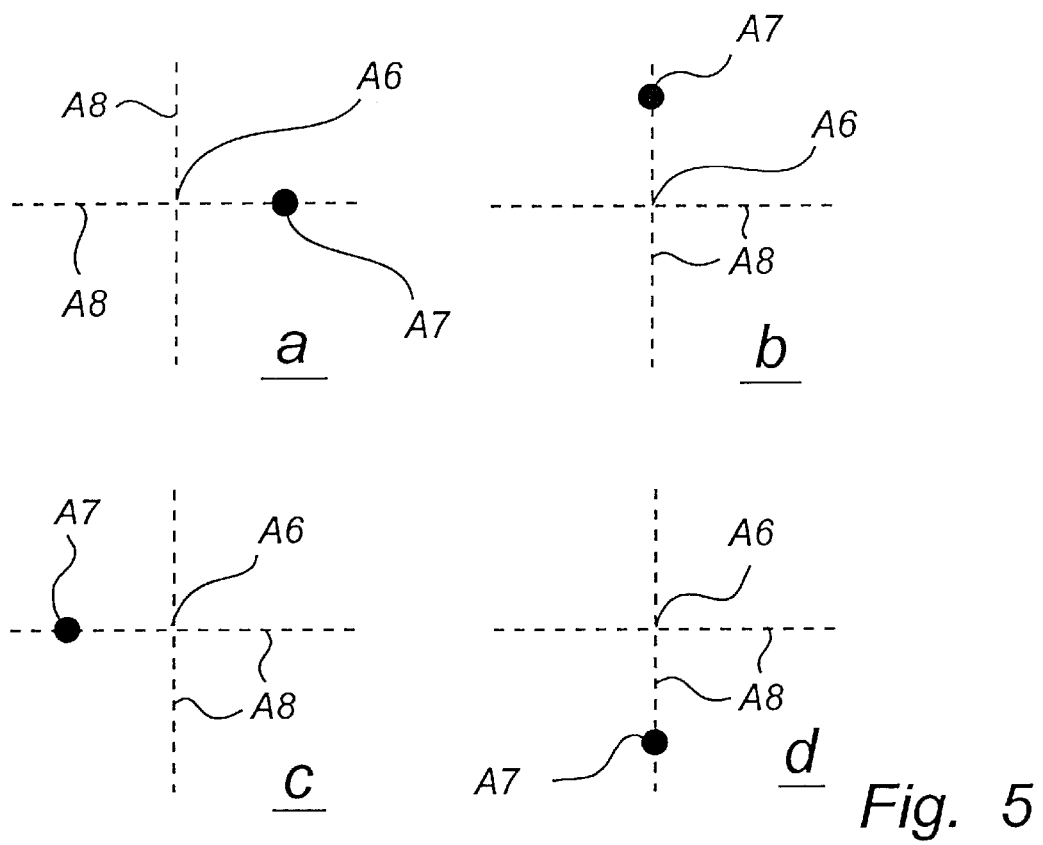
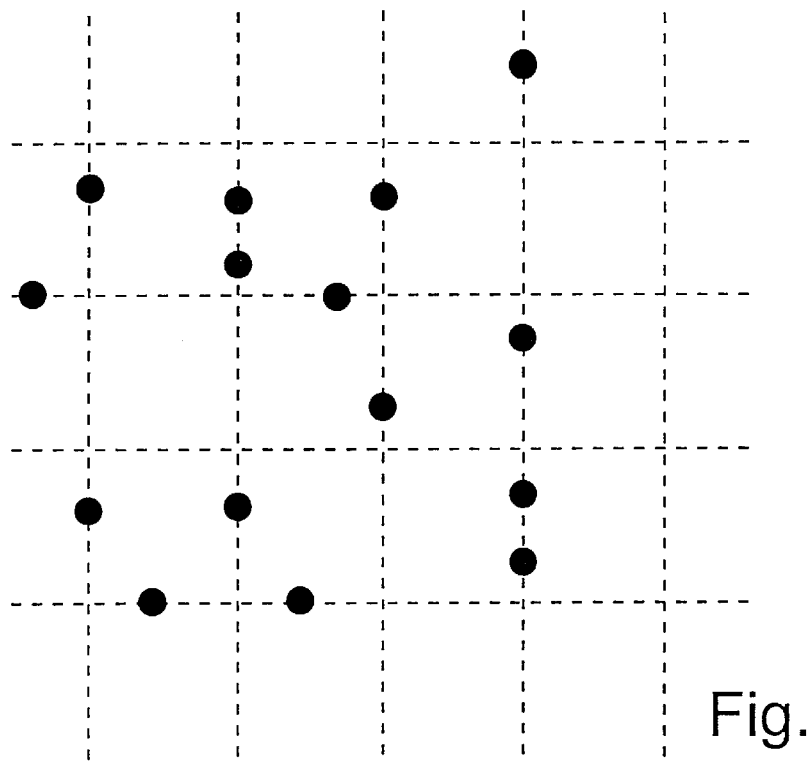
Fig. 5
Fig. 6

INFORMATION MANAGEMENT SYSTEM WITH AUTHENTICITY CHECK

CROSS REFERENCE TO RELATED APPLICATION

This application claims the benefit of U.S. Provisional Application No. 60/177,304, filed Jan. 21, 2000.

FIELD OF THE INVENTION

This invention relates to a payment product comprising at least one writing area which is intended to receive handwritten information from a user and which is provided with a first position-coding pattern which makes possible digital recording of the handwritten information. The invention also relates to a server unit, a system for information management, use of an absolute position-coding pattern and a hand-held electronic user unit.

BACKGROUND ART

Security in association with payment by means of cheques is a problem. There is always a risk that an unauthorized person will obtain another person's cheques, forge this person's signature and in this way obtain money that belongs to the owner of the cheque or buy goods that are charged to the owner of the cheque.

Many solutions have been proposed which aim to make it more difficult for unauthorized persons to forge signatures and use another person's cheques.

EP 0 276 109 describes a cheque which, in a writing area where the user is to write his signature, is provided with a shading which varies in intensity from the upper edge to the lower. The user signs the cheque with a pen which has a sensor which records the intensity at the pen point. The pen thus produces an output signal which has an intensity which varies with time, depending upon the position of the pen on the writing area.

As an alternative, the writing area can be provided with a large number of squares all of which have shading with different intensity. Also in this case, the pen produces an output signal which varies in intensity with time, depending upon the position of the pen on the writing area.

The output signal from the pen can be used to compare the user's signature with a previously-stored signature of the user, in order to check that it is actually the authorized user who is signing the cheque in question.

EP 0 132 241 discloses a similar method for verifying signatures, according to which a user whose signature is to be verified writes his signature using a reading pen on a bar code consisting of parallel dark lines separated by paler lines or areas. When the user writes his signature the reading pen emits light and records the reflected light, generating a pulse train. The pulse train is compared in a computer with one or more pulse trains which were generated earlier by the person and stored in the computer, in order to verify that the person is who he or she purports to be. In order to increase the security the bar code can contain information which is specific to that person, for example the person's date of birth, coded in the bar code.

There are also problems in connection with other payments, such as credit card payments. An unauthorized person who finds another person's credit card can forge the card holder's signature on a slip and in this way buy goods which are charged to the card holder.

The security problems are increased when credit card payments are made remotely via a computer network, as payments are normally drawn out of the credit card account on the basis of just the credit card number. No signature is required from the person who is ordering payment.

Payment by cheque remotely via computer networks does not occur at all.

There remains, however, the general problem of verifying remotely and by means of computers the identity of a person who sends information in a computer network.

SUMMARY OF THE INVENTION

It is thus a general object of this invention to show a solution to the above problems.

It is also a special object to show a solution which makes possible increased security in association with payment orders which require the payer's signature on a payment product.

These objects are achieved completely or partially by means of a payment product according to claim 1, a server unit according to claim 12, a system for information management according to claim 19, use according to claim 30 and a user unit according to claim 32.

More specifically, according to a first aspect, the invention relates to a product comprising at least one writing area which is intended to receive handwritten information from a user and which is provided with a first position-coding pattern which makes possible digital recording of the handwritten information. The product is characterized in that the first position-coding pattern is a subset of a second position-coding pattern, which is an absolute position-coding pattern which codes coordinates of a plurality of points on an imaginary surface, the first position-coding pattern being intended both for the digital recording of the handwritten information and for authenticity checking.

An advantage of using a position-coding pattern which is a subset of a larger absolute position-coding pattern is thus that security can be increased by utilizing checks which are based on the knowledge that a particular product is provided with a specific subset of the larger position-coding pattern.

The first position-coding pattern on the product has thus a dual function. It makes possible digital recording of a position locally on the writing area on the product so that handwritten information can be recorded, and also makes possible the determination of a position globally in the second larger position-coding pattern, which position can be used for the authenticity check.

It should be pointed out that the authenticity check does not need to be carried out when the handwritten information is being written, but can be carried out afterwards, either by means of a check against the physical original or by means of a check against digitally-stored information.

The second position-coding pattern does not need to be stored in its entirety anywhere. By the fact that the first position-coding pattern is a subset of a second position-coding pattern is here meant that the coding is such that further unique first position-coding patterns can be created and that anywhere in a system where the product is used use can be made of the fact that the position of the first position-coding pattern within the second position-coding pattern can be determined.

The second position-coding pattern is, as mentioned, an absolute position-coding pattern which codes coordinates for a plurality of points on an imaginary surface. The advantage of this type of coding is that the second position-coding pattern does not need to be stored anywhere but can be described by coordinates. In addition it is simpler and quicker to determine the position of the first position-coding pattern in the second position-coding pattern. If an image which was unique in all its parts had been used instead of the second position-coding pattern, it would have required matching of the first position-coding pattern against different parts of the second position-coding pattern in order to determine the position of the first position-coding pattern in the second position-coding pattern. Instead coded coordinates provide a position directly.

In addition the absolute position-coding pattern makes it possible to determine the precise position in which the handwritten information was written on the product. This can be valuable if at a later date it is wished to check that the digital version actually originates from a particular physical product.

The resolution of the first position-coding pattern is suitably such that digital reproduction of the handwritten information is made possible. It is thus possible to show digitally an image of how the handwritten information appears on the physical product. In addition, with knowledge of the appearance of the physical product, it is possible to create a precise digital copy of the physical product with the handwritten information.

There are known absolute position-coding patterns, see for example U.S. Pat. No. 5,852,434, where each position is coded by means of a unique symbol. This has the disadvantage that each symbol becomes rather complex, at least if a large number of positions are to be coded, which in turn means that the symbols cannot be made too small, as they would then be difficult to read and the risk of errors would increase. In addition, in each position the device which is to read the position-coding pattern must read an area corresponding to four symbols in order to be certain of recording a complete symbol.

According to the invention, the first position-coding pattern is instead constructed of a plurality of symbols, the coordinates of each point being coded by means of a plurality of symbols and each symbol contributing to the coding of more than one point. In this way, a high resolution is achieved. Examples of this type of position code are to be found in Applicant's International Patent Applications WO 00/73983 and PCT/SE00/01895. These applications are incorporated herewith by reference.

In an advantageous embodiment, the first position-coding pattern is unique to the authorized user of the product. Each user can thus be allocated his "own" subset of the larger position-coding pattern. This subset can, for example, be arranged on cheques or on some other product which belongs to the user and which is used to carry out the authenticity check, where a user, for example, is assumed to be who he purports to be if he writes handwritten information on his personal subset of the position-coding pattern.

As a second example, the user can be provided with personal credit card receipts with the personal subset of the position-coding pattern. He can use these credit card receipts when he wants to make a payment using his credit card via a computer network or in a shop and wants to make possible digital verification of his identity.

As a further example, the first position-coding pattern can be arranged on an identification card, on which the user writes, for example, his signature with a digital pen when he wants to verify his identity digitally. The digital pen transmits the signature to the server unit which checks the authenticity of the signature by comparison with a previously-stored signature and by checking that the position-coding pattern is the correct one. The server unit can then send a confirmation of the user's authenticity to a recipient. Alternatively, the authenticity check can be carried out in the pen.

As the first position-coding pattern is uniquely associated with a user, the user can thus digitally verify his identity by what he writes being recorded digitally by means of coordinates which are coded by the first position-coding pattern.

In addition, the first position-coding pattern can be unique to each item of the product. This means that it is possible to determine precisely on which individual product the handwritten information was written, which can be very valuable, for example when the product is a cheque or other instrument of value which can only be used once or which requires increased security in the authenticity check.

Alternatively, the first position-coding pattern can be unique to a type of product, so that, for example, it is possible to determine that the handwritten information was written on a particular category of product, for example cheques as distinct from postal giro forms.

In a preferred embodiment, the handwritten information comprises the user's signature. Many products, particularly payment products, require a signature from a user as confirmation of the transaction that the product defines. In such cases the signature can be recorded, checked and stored digitally by means of the first position-coding pattern. It is thus possible to carry out transactions digitally which previously could only have been carried out with paper products. For example, it is possible to process cheques digitally for payment remotely via computer networks. To date a user has been forced to hand over a signed paper cheque, when he or she has wanted to pay by cheque. With a product according to this invention it is, however, possible to identify the product by reading the unique position-coding pattern on which the signature is written and it is thus possible to carry out electronic transactions. In addition, this has the advantage that the user retains a paper copy of the payments he or she has made.

In order for a signature on a cheque to be accepted, it is thus not sufficient for it to resemble a previously stored signature, but it must also be written on the "correct" subset of the position-coding pattern.

In one embodiment, the product can comprise a plurality of additional writing areas for recording additional handwritten information which is related to the product, which additional writing areas are provided with position-coding patterns which make possible digital recording of the additional handwritten information.

The first position-coding pattern can thus be repeated in the additional writing areas. Alternatively, the first position-coding pattern can constitute a greater part of the second larger position-coding pattern, so that the first position-coding pattern can cover all the writing areas and so that the positions within the different writing areas can be distinguished. As a further alternative, the additional writing areas can be provided with second subsets of the larger second position-coding pattern, which subsets are not in continual correspondence with the first position-coding pattern.

The additional information can be such information as is normally written on a cheque, a form or the like. By means of the position-coding pattern, it is possible to identify precisely where on the product a piece of information was written and thus to distinguish different pieces of information from each other without them needing to be written in any particular order.

The product can be any product for which it is necessary to carry out some form of authenticity check, for example a sheet of paper with an agreement which is to be signed and which is provided with a first position-coding pattern in a writing area where the parties to the agreement are to sign.

Another type of product where an authenticity check is relevant is, as shown above, various types of payment product, on which a user writes information by hand, often his signature, when carrying out a payment transaction. The payment product can, for example, be a credit card receipt, a bank or postal giro form, a cheque or a gift certificate.

If a payment product which is to be signed is provided with a position-coding pattern which is unique to the user, the security is increased greatly as an impostor must forge both a signature and a specific position-coding pattern which codes coordinates for points within a particular coordinate area.

A product according to the invention thus makes possible electronic payment under secure conditions.

According to a second aspect, the invention relates to a server unit for managing information, which server unit is arranged to receive information from a plurality of user units, the server unit being characterized in that the server unit has access to a memory, in which is stored information about a plurality of regions, each of which represents a coordinate area on at least one imaginary surface, that the server unit is arranged to receive said information in the form of at least two coordinates for at least one point on the imaginary surface, and that the server unit is arranged to determine to which region the coordinates belong in response to the receipt of the information from one of the said user units, and to carry out an authenticity check on the received information on the basis of the region affiliation.

According to the invention, at least one imaginary surface is thus used, which is divided into different regions (coordinate areas) in order to make possible authenticity checking. The handwritten information is channeled via the server unit which identifies to which region the coordinates belong. Different regions can, for example, be associated with different products, with different companies and/or with different users of a product. In this way, it is possible to build one or more security levels into a system for information management.

The system provides many advantages for different users. An individual who uses the system can identify himself in a secure way without the use of passwords, PIN numbers, smart cards or other security systems. As the information is recorded electronically, the user can retain the physical product as a reminder and/or as proof of the information which was recorded digitally and sent to a server unit.

A company which uses the system can lease a region or gain access to a region in some other way. The company can then check, or have the server unit check, that the handwritten information which is received in digital form is represented by coordinates from the correct region.

The coordinates which the user units record can be sent to the server unit in some form which requires processing in order for the region affiliation to be determined. They can also be sent in explicit form.

In a preferred embodiment, at least one authorized user is associated with at least certain of the regions, the server unit being arranged to check the authorization of the user by means of the region affiliation when carrying out the authenticity check.

A company can thus mark its products with coordinates which belong to a particular region. Before a user is allowed to use the product, the user must be registered with the company. Thereafter the user can use the product and the company can carry out security checks by checking that the user is actually registered as an authorized user of the region.

In a particularly preferred embodiment of the system which provides high security, there is only one authorized user for a region.

In one embodiment, there is at least one unique user identity associated with at least certain of the regions, which user identity identifies the user unit which is authorized to record coordinates for points within the region, said information comprising the unique user identity and the server unit being arranged to use the unique user identity to check the authorization of the user when carrying out the authenticity check.

In this case security can thus be increased. In order for the handwritten information which is received in digital form by the server unit to be regarded as correct, it must be written on the correct subset of the position-coding pattern and in addition must be written using the correct user unit. In order for an impostor to succeed in passing himself off as being a particular person, he must thus write the information on the correct position-coding pattern and also obtain that person's user unit.

The user identity can be a serial number of the user unit or some form of code which has been stored in the user unit specifically for this purpose.

In a preferred embodiment, a signature of the authorized user of the region is associated with at least certain of the regions, said information comprising a digital representation of a user's signature and the server unit being arranged to compare the signature in the received information with the signature associated with the region concerned when carrying out an authenticity check.

The signature is represented in the form of coordinates which are received from the user unit. The coordinates have thus the dual function of both representing the signature and indicating the region affiliation. It is possible to determine which coordinates represent the signature in the received information due to information being stored in the server unit about which coordinate area corresponds to the position-coding pattern on the writing area where the signature is to be written on the product.

By combining checking that the coordinates belong to the correct region, that the information is written using the correct user unit and that the signature is correct, a very high level of security can be achieved.

It should also be pointed out that the signature check can alternatively be carried out by signature verification software in the user unit only after the user unit has approved the signature, is the rest of the hand-written information forwarded to the server unit, where a further authenticity check can be carried out on the basis of which region the received coordinates belong to and on the basis of the unique user identity of the user unit.

The server unit can be the unit which finally processes the received information. However, the server unit is preferably just an intermediate unit which carries out certain processing of the information which is received from the user units and then forwards it to a recipient.

The recipient can be specified in the received information, but in an advantageous embodiment the recipient is determined by the region affiliation. The recipient can be the party leasing or in some other way having the right to use the domain, for example a company, or some other recipient whose address is associated with the domain.

In addition, the recipient can be a final recipient or an intermediate recipient which in turn forwards the payment information to the final recipient. The recipient can also be one of said user units, for example the user unit from which the server unit received the information.

The server unit can be arranged to include information concerning the region affiliation in the information which is sent to the recipient. The recipient can, for example, have the right to a larger region or a large number of smaller regions. The recipient can himself have provided users with products with unique position-coding patterns which correspond to a part or all of such a region. Therefore the recipient must know to which region or part thereof the information belongs.

The server unit can also be arranged to include information about the outcome of the authenticity check in the information which is sent to the recipient.

According to a third aspect of the invention, this relates to a system for managing information, which system comprises a server unit and a plurality of user units, each of which is arranged to record and send information to the server unit, which system is characterized in that information is stored in the server unit about a plurality of regions, each of which represents a coordinate area on at least one imaginary surface, that each of the user units is arranged to record the information in the form of at least two coordinates for at least one point on the imaginary surface, and that the server unit is arranged to determine, in response to the receipt of the information from one of said user units, to which region the coordinates belong and to carry out an authenticity check on the received information on the basis of the region affiliation.

According to a fourth aspect of the invention, this relates to use of an absolute position-coding pattern on a product in order to make it possible to check that a user is entitled to use the product, the absolute position-coding pattern being unique to the authorized user.

According to a fifth aspect of the invention, this relates to a hand-held electronic user unit, which is intended to be used in the system described above.

In a advantageous embodiment, the account number of the holder is stored in the user unit, so that it can be sent to a server unit automatically, without the user having to record all the digits in the number each time.

A hand-held electronic user unit with at least one stored account number could be used in other systems than the one described above.

The advantages of the system and the use are apparent from the discussion above.

It is realized that the characteristics which are discussed above for the product and the server unit, can also be applicable to the system, the use and the user unit.

BRIEF DESCRIPTION OF THE DRAWINGS

This invention will now be described in greater detail by way of example and with reference to the accompanying drawings.

FIG. 5 is a schematic diagram that shows how the marks can be designed and positioned in a preferred embodiment of the position-coding pattern.

FIG. 6 is a schematic diagram that shows examples of 4*4 symbols which are used to code a position.

DESCRIPTION OF PREFERRED EMBODIMENTS

Figures 1, 3:
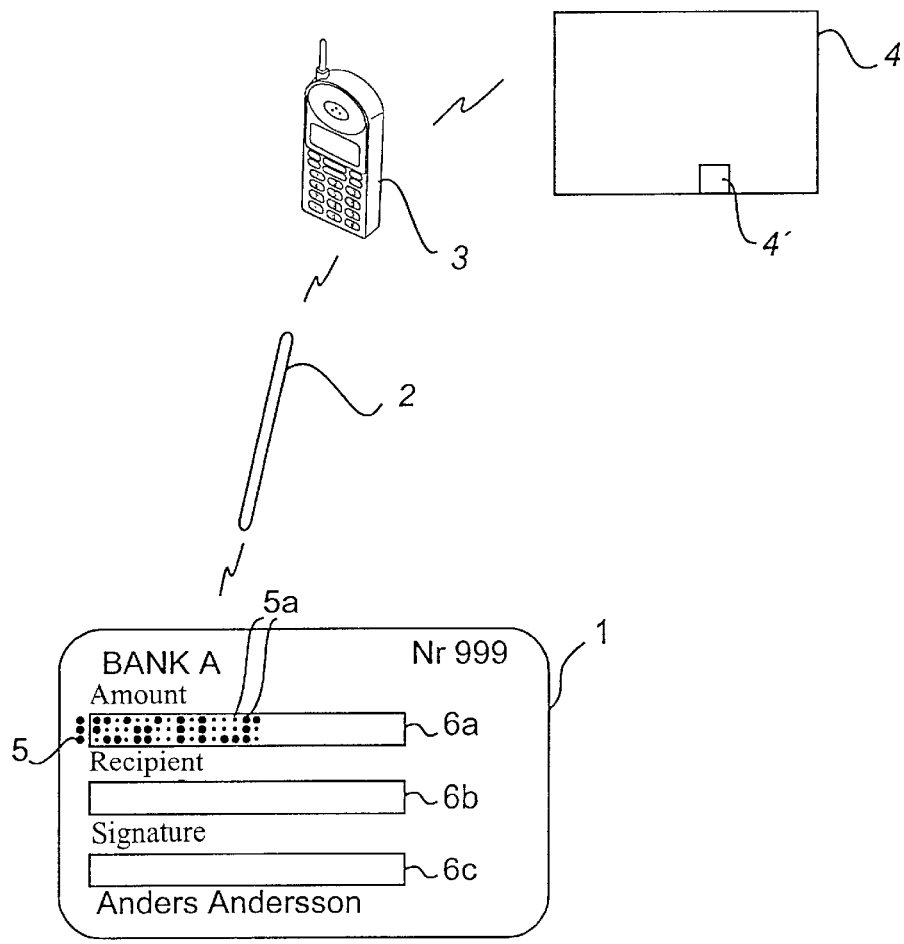
FIG. 1 is a schematic view of a system according to an embodiment of this invention.
FIG. 3 is a schematic diagram of a storage structure for region-based rules for information processing.

FIG. 1 shows an example of how a system according to the invention for managing information can be constructed. In this example, the invention is illustrated by means of payment information. The system comprises principally a plurality of payment products, a plurality of user units, a plurality of network connection units and a server unit. For the sake of clarity, however, only one payment product 1, one user unit 2, one network connection unit 3 and one server unit 4 are shown in FIG. 1.

The Payment Product

The payment product 1 can be any payment product which can be provided with coordinates so that these can be read by the user unit. The coordinates can be given in explicit or in coded form.

The payment product 1 consists in this example of a cheque which is provided with a position-coding pattern 5 across its whole surface. The pattern is shown very simplified and enlarged, as a number of dots on the cheque. For the sake of clarity, only part of the pattern on the cheque is shown. The position-coding pattern 5 on the cheque constitutes a subset of a larger position-coding pattern.

The cheque has three writing areas 6a, 6b, 6c, which are intended for handwritten information. The first writing area is intended for an amount, the second writing area for a recipient of the payment and the third writing area for the user's signature. Of course there can be additional writing areas for additional information which is required in connection with digital processing of cheques. One example could be a writing area in which the user specifies to which bank account the payment is to be made.

The Position-Coding Pattern

The position-coding pattern 5 can be constructed in various ways, but has the general characteristic that if any part of the pattern of a particular minimum size is recorded, then the position of this in the position-coding pattern and thus on the payment product can be determined unambiguously.

The position-coding pattern 5 can be of the type which is shown in the above-mentioned U.S. Pat. No. 5,852,434, where each position is coded by a specific symbol.

It is, however, desirable for the position-coding pattern to be used to record information at a high resolution and in addition to be used in a system which permits varied processing of the information. Therefore the pattern should be designed in such a way that it can code a very large number of positions given by absolute coordinates at high resolution. In addition, the position-coding pattern should be coded graphically in such a way that it does not dominate or interfere with the visual impression of the surface of the product. It should also be possible to detect the position-coding pattern with high reliability.

Therefore the position-coding pattern is advantageously of the type which is shown in the published international patent application WO 00/73983 filed on May 26, 2000, or in the international patent application PCT/SE00/01895 filed on Oct. 2, 2000, both of which applications are assigned to the present Applicant. In these patterns each position is coded by a plurality of marks or symbols, and each symbol contributes to the coding of several positions. The position-coding pattern is constructed of a small number of types of symbols.

An example is shown in WO 00/73983 where a larger dot represents a "one" and a smaller dot represents a "zero".

The currently most preferred pattern is shown in PCT/SE00/01895, where four different displacements of a dot or mark in relation to a raster point code four different values. This pattern is constructed of extremely small dots at a nominal distance apart of 0.3 mm. Any part of the pattern which contains 6×6 such dots defines a pair of absolute coordinates. Each pair of absolute coordinates is thus defined by a 1.8 mm×1.8 mm large subset of the position-coding pattern. By determination of the position of the 6×6 dots on the sensor in the user unit which is used to read the pattern, an absolute position on the imaginary surface can be calculated by interpolation with a resolution of 0.03 mm. A more complete description of the position-coding pattern according to PCT/SE00/01895 is given in the accompanying Appendix.

This position-coding pattern is able to code a large number of absolute positions. As each position is coded by 6×6 dots, each of which can have one of four values, $4^{36}$ positions can be coded, which with the above-mentioned nominal distance between the dots corresponds to a surface of 4.6 million $km^2$.

The position-coding pattern can be printed on any base which is capable of a resolution of approximately 600 dpi. The base can be any size and shape, depending upon its planned use. The pattern can be printed by standard off-set printing technology. Ordinary black carbon-based printing ink or some other printing ink which absorbs infrared light can advantageously be used. This means that other inks, including black ink which is not carbon-based and which does not absorb infrared light, can be used to superimpose other printing on the position-coding pattern without interfering with the reading of this.

A surface which is provided with the above-mentioned pattern printed with a carbon-based black printing ink will be perceived by the eye as only a pale gray shading of the surface (1–3% density), which is user-friendly and esthetically pleasing.

Of course, fewer or more symbols can be used to define a position than as described above, and larger or smaller distances between the symbols can be used in the pattern. The examples are only given to show a currently preferred realization of the pattern.

The User Unit

Figure 2:
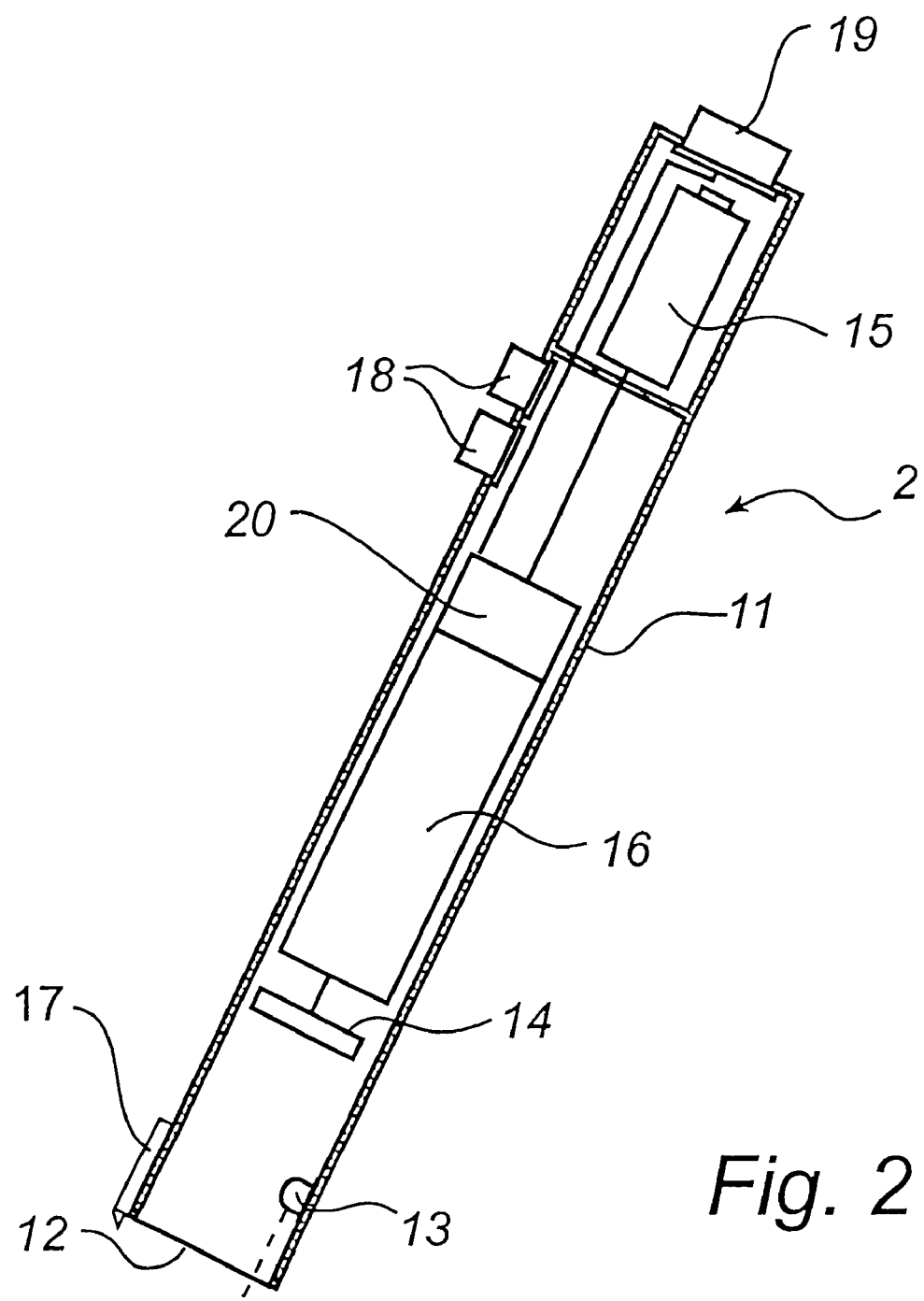
FIG. 2 is a schematic internal view of a user unit.

FIG. 2 shows an example of a user unit 2, which in this case consists of a digital pen. It comprises a casing 11 which is approximately the same shape as a pen. In a short side of the casing there is an opening 12. The short side is intended to be held in contact with or a short distance from a base provided with a position-coding pattern.

The casing essentially contains an optics part, an electronic circuitry part and a power supply.

The optics part forms a digital camera and comprises at least one infrared light-emitting diode 13 for illuminating the surface which is to be imaged and a light-sensitive area sensor 14, for example a CCD or CMOS sensor, for recording a two-dimensional image. The user unit may also contain a lens system. The infrared light is absorbed by the symbols in the position-coding pattern and in this way makes them visible to the sensor 14. The sensor records advantageously at least 100 images per second.

The power supply for the pen is obtained from a battery 15 which is mounted in a separate compartment in the casing. Alternatively, however, the pen can be connected to an external power source.

The electronic circuitry part comprises a signal processor 16 for determining a position on the basis of the image recorded by the sensor 14 and more specifically a processor unit with a microprocessor which is programmed to record images from the sensor, identify symbols in the images and to determine in real time absolute coordinates for positions on the imaginary surface on the basis of the imaged subset of the position-coding pattern. In an alternative embodiment, the signal processor 16 is realized as an ASIC (Application Specific Integrated Circuit) or an FPGA. (Field Programmable Gate Array).

The position determination is thus carried out by the signal processor 16 which therefore must have software to enable it to locate and decode the symbols in an image and to enable it to determine positions from the codes thus obtained. A person skilled in the art would be able to design such software from the description in the above-mentioned patent application PCT/SE00/01895.

The signal processor 16 is also programmed to analyze stored pairs of coordinates and to convert these into a polygon train which constitutes a description of how the user unit 2 has been moved across the surface which is provided with the position-coding pattern. Finally, the signal processor 16 is programmed to generate, automatically or upon command, a message which contains the polygon train and a unique user identity which is stored in the user unit and to send this information to the central unit 4. The signal processor 16 does not need to forward all the information to the central unit 4. The signal processor 16 can be programmed to analyze the recorded coordinates and only to forward information which is represented by coordinates within a particular coordinate area. The signal processor 16 can also have software for encrypting the information which is sent to the server unit 4.

The digital pen 2 comprises in this embodiment a pen point 17, by means of which the user can carry out ordinary pigment-based writing on the surface provided with the position-coding pattern. The pen point 17 can be extended and retracted so that the user can control whether or not it is to be used. A button (not shown) for extending and retracting the pen point, in the same way as in an ordinary ball-point pen, can also function as an on/off button for the pen, so that the pen is activated when the pen point is extended. The pen also comprises buttons 18 by means of which the pen can be activated and controlled.

The pen 2 is arranged to transmit payment information which is generated by the user to the server unit 4. In the example according to FIG. 1, the information is transmitted wirelessly to the network connection unit 3, which in turn transmits the information to the server unit 4.

In this example, the network connection unit is a mobile telephone 3. It can alternatively be a computer or some other suitable unit which has an interface to a network, for example the Internet, a local company network, or a telephone network. The network connection unit 3 can alternatively constitute an integrated part of the pen 2.

All the recorded data can be stored in a buffer memory 20 awaiting transmission to the central unit 4. Thus the digital pen 2 can work in stand-alone mode, that is the pen 2 sends the information when it has the opportunity, for example when it makes contact with the network connection unit 3, whereupon it retrieves recorded information from the buffer memory 20.

The communication between the pen 2 and the network connection unit 3, which are normally located fairly close to each other, can be carried out via infrared or radio waves, for example in accordance with the Bluetooth® technology, or some other technology for the transfer of information across short distances. For this purpose the pen 2 has a transceiver 19 for wireless communication with external units, preferably a Bluetooth® transceiver.

Alternatively, the transmission can be via cables. For example, the user unit 2 can be connected via a cable to the network connection unit 3. Alternatively, the network connection unit 3 can be designed as a docking unit (not shown) which can be connected via cables to a communication network, such as a telephone network or a computer network. Such a docking unit can advantageously be designed as a pen stand. When the user unit 2 is placed in the docking unit, the user unit 2 is caused, automatically or upon command, to communicate with the server unit 4. The docking unit can also be designed to charge the battery 15 (FIG. 2) in the user unit 2. According to another alternative, the docking unit is designed to establish wireless connection with the outside world.

The above example is only given to show a currently preferred implementation of the user unit. In an alternative embodiment, the user unit operates only as an image generator, that is the images recorded by the sensor 14 are transmitted to a computer (not shown), which processes the images to determine coordinates as above, and which communicates with the central unit 4 via a suitably incorporated network connection.

In the embodiment above, the pattern is optically readable and the sensor 14 is thus optical. The pattern can, however, be based on a parameter other than an optical parameter. In such a case the sensor must of course be of a type which can read the parameter concerned. Examples of such parameters are chemical, acoustic or electromagnetic marks. Capacitive or inductive marks can also be used. However, it is preferable for the pattern to be optically readable as it is then relatively simple to apply it onto different products and in particular onto paper.

The Server Unit

The server unit 4 in FIG. 1 is a computer in a network of computers. It can be constructed as a traditional server unit with one or more processors, memories of various kinds, peripherals and connections to other computers in the network, but it has new software in order to be able to carry out the functions described here. It also has information stored in its memory 4' in order to be able to handle these functions. The server unit 4 can alternatively be some other type of network-connected computer or a local computer, with which the user unit 2 communicates wirelessly or by cables.

As shown above, several user units 2 can be arranged to send their information to the server unit 4 which is thus a central part of the system. Several such systems can, however, together form an even larger system.

The server unit 4 does not need to be incorporated in a global network, but can be incorporated in a local network and can be used to manage information, for example within a company.

The server unit's 4 memory 4' comprises a database with information about the total surface of positions which the position-coding pattern can code. The total surface forms an imaginary surface which can be said to be a surface in a coordinate system, which surface thus contains a large number of positions which are systematically arranged in two dimensions with a particular specified resolution. This can also be expressed by saying that the total surface is made up of all the points or positions which the position-coding pattern has the capacity to code. Each position can be defined by two associated coordinates which form a pair of coordinates. If there is more than one imaginary surface, more than two coordinates can be required in order to define a position.

The imaginary surface is divided into a number of areas which are called regions. The regions can be different sizes and be different shapes. The whole surface does not need to be occupied by regions. In the server unit's memory there is information stored concerning the position and extent of these different regions. A rectangular region can, for example, be described by means of a pair of coordinates representing the points at the corners of the domain.

The smallest possible region consists of a single position on the imaginary surface. The regions can also be any shape. Nor do the regions need to be separated from each other, but can overlap each other and be defined by mathematical relations or associations.

Rules

In a computer structure, in the server unit's memory information or rules define for each region how the information which can be associated with the region is to be processed.

FIG. 3 shows an example of such a structure, which consists here of a table. In a first column 30 in the table the regions on the imaginary surface are defined by means of the coordinates (x1,y1; x2,y2; x3,y3; x4,y4) for the corners of the regions which are assumed here to be rectangular. In a second column 31 an owner of the region is defined, which is here the bank A. In a third column 32, a recipient of the information from the server unit is defined. In this example, the bank is the recipient and therefore the e-mail address of the bank is given in the third column. In the fourth column 33, an authorized user of the region is defined. In this example, it is Anders Andersson who has cheques with a position-coding pattern from the region which is specified in the first column. In a fifth column 34, a representation of the signature of the authorized user is stored so that the server unit can compare a received signature with the previously-stored signature. In a sixth column 35, a user identity is stored in the form of a serial number of the authorized user's user unit.

Of course, this is a very simple structure which is only used to illustrate the principles. Considerably more complex structures and rules for security checks are possible.

The Function of the System

In this embodiment the function of the system is as follows. A user writes, using the pen point 17 of the user unit 2, an amount, a payment recipient and his signature on the cheque 1. The payment information is recorded electronically at the same time as it is being written with the pen point on the cheque, by the user unit 2 continually recording the part of the position-coding pattern which is within the field of view of the area sensor 14 during the writing. The signal processor 16 converts the position-coding pattern into absolute coordinates. The signal processor thus generates a sequence of pairs of coordinates which describes how the user has moved the user unit over the cheque during the writing. The signal processor compresses the payment information by converting it into a polygon train of pairs of coordinates. Then the signal processor generates a message which contains the polygon train and the unique user identity which is stored in the user unit. The message is transmitted to the network connection unit 3 which in turn transmits the message to the server unit 4.

When the server unit 4 receives the message, it determines to which region one or more of the pairs of coordinates in the polygon train belong. Then it uses the information associated with the region to carry out the authenticity check.

In order to increase the capacity of the system to manage information, this can comprise several server units 4, each of which contains information about at least part of the imaginary surface. In this case, however, each user unit 2 must know, or be able to obtain information about, to which of the server units the recorded information is to be sent. For this purpose the user unit's 2 memory can contain information about the association between server units and regions on the imaginary surface. The user unit 2 is thus arranged to determine, after recording of the information, the region affiliation for at least one position, defined by a pair of coordinates, of the recorded information and based on the region affiliation send the information to a predetermined server unit. The user unit's 2 memory can, for example, advantageously contain information that makes it possible for the user unit to recognize that certain positions or coordinate areas on the imaginary surface represent particular operations or commands which are to be initiated and/or carried out with regard to information which has been or is to be recorded. Preferred commands which can be recognized in the user unit 2 are "send", "address" and other similar basic commands.

APPLICATION EXAMPLE 1

Assume that the payment product is the cheque in FIG. 1. The user wants to pay SEK 1000 by cheque to the company Alfa. The user fills in the amount SEK 1000 in the writing area 6*a* and the name of the company Alfa in the writing area 6*b*. Then he signs the cheque with his signature in the writing area 6*c*.

To fill in and sign the cheque the user uses his personal user unit 2 which records the payment information and includes this together with the user unit's unique identity in a message which is sent to the server unit 4. The server unit determines to which region the coordinates in the payment information belong. As stated above, with reference to FIG. 3, the name of the authorized user, the unique user identity of the authorized user's user unit, a previously-recorded signature of the authorized user, and the name of the recipient to whom the payment information is to be sent in processed form, are associated with this region.

The server unit starts by comparing the signature in the payment information with the previously-stored signature in column 34 in order to check that the signatures are the same. Then the server unit compares the user identity in the payment information with the user identity which is associated with the region in column 35 in order to check that they are also the same. In addition, the server unit interprets the other payment information in the message and converts it into character-coded format. The character-coded payment information, the name of the user and the result of the comparison are sent to the recipient, which is the bank which issued the cheque. If the user is the authorized user, the bank makes the payment.

Alternatively, the server unit can be the bank's own server unit which carries out the authenticity check itself.

In the example above, the position-coding pattern on the cheque is unique to the user. It can also be unique to each individual cheque, so that the cheque number can be determined from the position-coding pattern. The server unit can then also check that the cheque has not already been used and that it has a number which follows the most recently used cheque. In order to increase the security further, the position-coding pattern for the consecutive cheques can be randomly distributed within a region or can belong to regions which are not consecutive.

APPLICATION EXAMPLE 2

A user has been allocated a personal region by a credit card company, together with a pad of credit card receipts which are provided with the position-coding pattern from this region. The position-coding pattern can be the same on all the receipts or different on the different receipts if the level of security is to be higher.

Assume that the user finds a product on the Internet that he wants to buy. He can then pay by using one of his credit card receipts and his personal user unit. He writes the amount which is to be paid, the payment recipient, a reference and any additional information which is required in order for the payment to be identified on the credit card receipt and finally signs it.

The user unit includes the electronically-recorded payment information in a message to the server unit and also supplements this information with the user's credit card number which is stored in the user unit.

The information is sent either to a server unit which carries out corresponding checks as in the case of the cheque, and sends a message with the payment information and the result of the authenticity check to the credit card company or direct to the credit card company's own server unit. As an additional alternative, a first server unit to which the payment information is sent can interpret the information and convert it into character-coded format and then send the information to the credit card company which is specified as the information recipient for the region concerned.

If instead the user wants to make an credit card payment in a shop, he can use one of his personal credit card receipts in the same way as described above, but instead he uses the shop's user unit when he writes on the receipt and also supplements the payment information with his credit card number which he writes on the receipt. The server unit then detects that the signature is the same as the previously-stored signature for the user's personal domain, that the credit card number is the same as a previously-stored credit card number for the domain, but that the user unit's unique user identity is not the same as that which is specified for the user's personal region. The server unit can then check the user identity in a special table, whereupon it finds that the user identity refers to a company user unit to which authorization information is to be returned. The shop thus immediately receives back information that the payment is in order and the server unit then forwards the payment information in the same way as described above.

APPLICATION EXAMPLE 3

Assume that an agreement is to be signed digitally. A unit which processes the signature and which can be the server unit 4 in FIG. 1, sends the agreement in digital form in a file to a computer which belongs to a person who is to sign the agreement. The file with the agreement includes a position-coding pattern which has been specifically allocated to that agreement and the person who is to sign the agreement. When the person receives the agreement file, he prints out the agreement and signs it in the designated place on the position-coding pattern using his personal user unit. This sends the signature to the server unit 4, which can determine, by means of the coordinates by which the signature is represented, that the signature is written on the agreement which was sent to the party to the agreement. If required, the authenticity of the signature can also be verified in a data-base which stores unique user identities and associated signatures. As an alternative, the user unit itself checks the authenticity of the signature and only forwards it if it is in order.

In the description above, it has been assumed that the payment product is provided with a position-coding pattern from the start. However, a payment product which is not already provided with a position-coding pattern can have such a pattern applied later, by means of a printer, copier or the like. For this, the payment product is placed in the printer's input paper bin. The printer is programmed to print out the first position-coding pattern which is reserved for a particular person, by entering a personal identity code. The personal identity code means that the printer can print out the correct pattern, which is allocated to the person who is authorized to use the product. In the case of a copier, the product is placed in the input bin and an original with the user's personal pattern is placed as the document which is to be copied. It is also possible to have the personal pattern on a sheet of plastic, which is placed over the payment document and the information is filled in on the plastic sheet. The plastic sheet is then saved to constitute a copy of the required payment. If the payment product is a postal giro or bank giro form, the plastic film can be attached permanently to the document, for example by means of adhesive.

The natural way to write out a document (payment product) of this type is first to fill in all the information that is required, or to check that all the preprinted information is correct. The document is then signed and after that the document cannot be changed.

This method can also be used in the present situation. First everything that the pen writes is recorded in the memory and is time-stamped and the document is signed. Then the pen waits a short while, in order to verify that no more writing is being carried out, for example 2–3 seconds. Following this, the recorded pen movements are compiled into a file which is locked and after that cannot be changed. Finally, the file is sent to a bank, for example by connection to a network, such as the Internet. The transmission can be initiated when no further writing is carried out in the writing area intended for the signature.

Another way of indicating that the transmission is to take place, when it is the user's pen that is being used, is as follows. When no further writing is carried out for 2–3 seconds in the writing area intended for the signature, software in the pen is activated which operates on the signature in the signature area and indicates whether it is the same as the signature of the owner of the pen. If this is the case, the document is compiled, locked and sent, for example to the bank.

Locking means that a digital signature procedure is carried out where the document is encrypted with the user's encryption key according to prior-art technique. The pen's private key, which has been activated by the locking procedure by the correct signature having been written, is used to sign the message. The physical signature, in digital format, can be included in the document which is sent to the bank. The bank can verify the signature again, possibly using even better software than that used in the pen, in order to further improve the security. Other combinations of measures can be used, for example the signature can be used to initiate locking of the file, while transmission is initiated in another way, for example by activating a switch on the pen or by marking a separate "send" box.

The transmission to the bank can be combined with a transmission to the person's own personal computer in order to achieve a logging of the payments which have been ordered. In addition, the bank can confirm the receipt of a payment order, and confirm that the payment order could be interpreted and implemented. Such confirmation can be sent to a mobile phone which the user uses and/or to the user in person or to the user's personal site on an Internet-based server.

In another scenario, it is possible for the owner of the pen to receive a confirmation of the recipient to whom the document is to be forwarded, for example by an indication on said mobile phone. The user has the opportunity to approve the forwarding to the recipient by using for example the telephone's keypad. In such a way, the recipient can be authorized.

Appendix

In the following the description is reproduced of a preferred position-coding pattern according to the International Patent Application PCT/SE00/01895.

Figure 4:
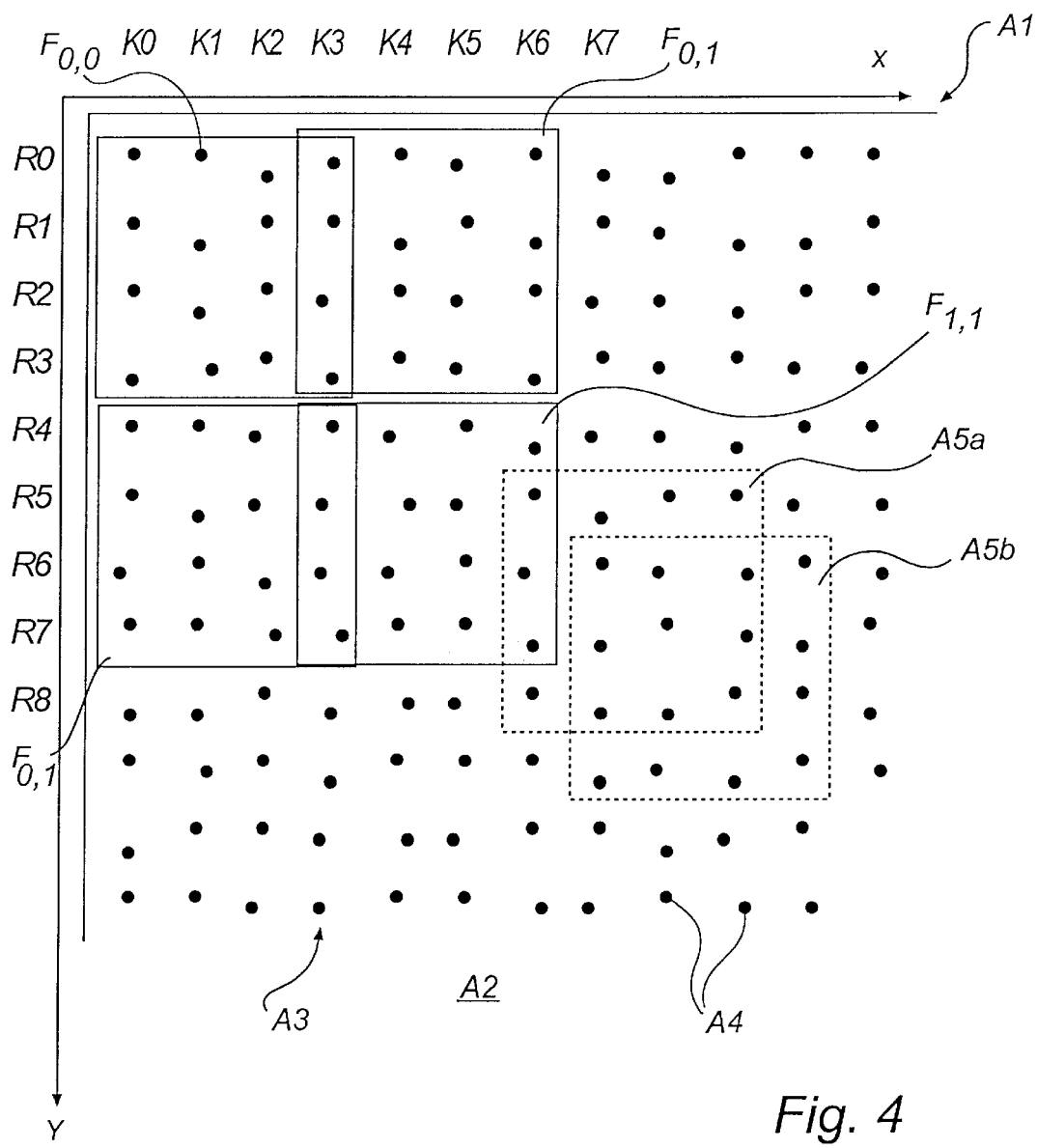
FIG. 4 is a diagrammatic view of a product which is provided with a position-coding pattern according to a preferred embodiment.

FIG. 4 shows a part of a product in the form of a sheet of paper A1, which on at least part of its surface A2 is provided with an optically readable position-coding pattern A3 which makes possible position determination.

The position-coding pattern comprises marks A4, which are systematically arranged across the surface A2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to produce an electronic representation of information which is written or drawn on the surface. The electronic representation can be produced while writing on the surface with a pen, by continually determining the position of the pen on the sheet of paper by reading the position-coding pattern.

The position-coding pattern comprises a virtual raster, which is thus neither visible to the eye nor can be detected directly by a device which is to determine positions on the surface, and a plurality of marks A4, each of which, depending upon its position, represents one of the four values "1" to "4" as described below. In this connection it should be pointed out that for the sake of clarity the position-coding pattern in FIG. 4 is greatly enlarged. In addition, FIG. 4 only shows part of the sheet of paper.

The position-coding pattern is so arranged that the position of a partial surface on the total writing surface for any partial surface of a predetermined size is determined unambiguously by the marks on this partial surface. A first and a second partial surface A5a, A5b are shown by broken lines in FIG. 4. The second partial surface partly overlaps the first partial surface. The part of the position-coding pattern (here 4*4 marks) which is found on the first partial surface A5a codes a first position, and the part of the position-coding pattern which is found on the second partial surface A5b codes a second position. The position-coding pattern is thus partly the same for the adjoining first and second positions. Such a position-coding pattern is called "floating" in this patent application. Each partial surface codes a specific position.

FIGS. 5a–d show how a mark can be designed and how it can be located relative to its nominal position A6. The nominal position A6, which can also be called a raster point, is represented by the intersection of the raster lines A8. The mark A7 has the shape of a circular dot. A mark A7 and a raster point A6 can together be said to constitute a symbol. In one embodiment, the distance between the raster lines is 300 $\mu$m and the angle between the raster lines is 90 degrees. Other raster intervals are possible, for example 254 $\mu$m to suit printers and scanners which often have a resolution which is a multiple of 100 dpi, which corresponds to a distance between points of 25.4 mm/100, that is 254 $\mu$m.

The value of the mark thus depends upon where the mark is located relative to the nominal position. In the example in FIG. 5 there are four possible locations, one on each of the raster lines extending from the nominal position. The displacement from the nominal position is the same size for all values.

Each mark A7 is displaced relative to its nominal position A6, that is no mark is positioned at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so well-defined, the pattern is unaffected by such interference.

In one embodiment, the marks are displaced by 50 μm relative to the nominal positions A6 along the raster lines A8. The displacement is preferably 1/6 of the raster interval, as it is then relatively easy to determine to which nominal position a particular mark belongs. The displacement should be at least approximately 1/8 of the raster interval, otherwise it becomes difficult to determine a displacement, that is the requirement for resolution becomes great. On the other hand, the displacement should be less than approximately 1/4 of the raster interval, in order for it to be possible to determine to which nominal position a mark belongs.

The displacement does not need to be along the raster line, but the marks can be positioned in separate quadrants. However, if the marks are positioned along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers several pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 5a represents the value 1, in FIG. 5b the value 2, in FIG. 5c the value 3 and in FIG. 5d the value 4.

Each mark can thus represent one of four values "1 to 4". This means that the position-coding pattern can be divided into a first position code for the x-coordinate and a second position code for the y-coordinate. The division is carried out as follows:

| Mark value | x-code | y-code |
|---|---|---|
| 1 | 1 | 1 |
| 2 | 0 | 1 |
| 3 | 1 | 0 |
| 4 | 0 | 0 |

The value of each mark is thus converted into a first value, here bit, for the x-code and a second it, for the y-code. In this way two completely independent bit patterns are obtained by means of the pattern. Conversely, two or more bit patterns can be combined into a common pattern which is coded graphically by means of a plurality of marks in accordance with FIG. 5.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four-bit-long bit sequence occurs more than once in the bit series. The bit series is cyclic, which means that the characteristic also applies when the end of the series is connected to its beginning. A four-bit sequence has thus always an unambiguously determined position number in the bit series. The bit series can be a maximum of 16 bits long if it is to have the characteristic described above for bit sequences of four bits. In this example, however, only a seven-bit-long bit series is used, as follows:

"0 0 0 1 0 1 0".

This bit series contains seven unique bit sequences of four bits which code a position number in the series as follows:

| Position number in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

The code the x-coordinate, the bit series is written sequentially in columns over all the surface which is to be coded, where the left column $K_0$ corresponds to the x-coordinate zero (0). In one column the bit series can thus be repeated several times in succession.

This coding is based on differences or position displacements between adjacent bit series in adjacent columns. The size of the difference is determined by the position number (that is the bit sequence) in the bit series with which the adjacent columns commence.

More specifically, if we take the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", on the two columns the difference is created. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four position numbers can be obtained in the y-direction. These three differences and four position numbers code the position of the partial surface in the x-direction and the y-direction. Adjacent windows in the x-direction have a common column, see FIG. 4. Thus the first code window $F_{0,0}$ contains bit sequences from the columns $K_0$, $K_1$, $K_2$, $K_3$, and bit sequences from the rows $R_0$, $R_1$, $R_2$, $R_3$. As differences are used in the x-direction, the next window diagonally in the x-direction and y-direction, the window $F_{1,1}$, contains bit sequences from the columns $K_3$, $K_4$, $K_5$, $K_6$, and the rows $R_4$, $R_5$, $R_6$, $R_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 4, for example $F_{0,0}$.

Each window has window coordinates $F_x$, which give the position of the window in the x-direction, and $F_y$, which give the position of the window in the y-direction. Thus the correspondence between the windows and columns is as follows:

$$K_i = 3F_x$$

$$R_i = 4F_y$$

The coding is carried out in such a way that for the three differences, one of the differences $\Delta_0$ always has the value 1 or 2, which indicates the least significant digit $S_0$ for the number which represents the position of the code window in the x-direction, and the other two differences $\Delta_1$, $\Delta_2$ have values in the range 3 to 6, which indicates the two most significant digits $S_1$, $S_2$, for the coordinate of the code window. Thus no difference can be zero for the x-coordinates, as that would result in too symmetrical a code pattern. In other words, the columns are coded so that the differences are as follows: (3 to 6); (3 to 6); (1 to 2); (3 to 6); (3 to 6); (1 to 2); (3 to 6); (3 to 6); (1 to 2); (3 to 6); (3 to 6); . . . .

Each x-coordinate is thus coded by two differences $\Delta_1$, $\Delta_2$ of between 3 and 6 and a subsequent difference $\Delta_0$ which is 1 or 2. By subtracting one (1) from the least difference $\Delta_0$ and three (3) from the other differences, three digits are obtained, $S_2$, $S_1$, $S_0$, which in mixed base directly give the position number of the code window in the x-direction, from which the x-coordinate can then be determined directly, as shown in the example below. The position number of the code window is:

$$S_2*(4*2)+S_1*2+S_0*1$$

Using the principle described above, it is thus possible to code the code windows 0, 1, 2, . . . , 31, using a position number for the code window consisting of three digits which are represented by three differences. These differences are coded by a bit pattern which is based on the number series above. The bit pattern can finally be coded graphically by means of the marks in FIG. 5.

In many cases, when a partial surface is inputted consisting of 4*4 marks, a complete position number which codes the x-coordinate will not be obtained, but parts of two position numbers, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, one row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows: (2 to 6); (2 to 6); (2 to 6); (0 to 1); (2 to 6); (2 to 6); (2 to 6); (0 to 1); (2 to 6); . . .

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained in a corresponding way as for the x-direction, from which the position number of the code window can be determined directly, which is:

$$S_3*(5*5*2)+S_2*(5*2)+S_1*2+S_0*1$$

Using the method above, it is possible to code 4*4*2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window is to start. If it is taken into account that this first number series can start in seven different positions, it is possible to code 7*96000=672000 positions. The start position of the first number series in the first column $K_0$ can be calculated when the x- and y-coordinates have been determined. The seven different start positions for the first series can code different pages or writing surfaces on a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/672000).

The redundancy consists partly in the restrictions on the size of the differences, and partly in only 7 bits out of 16 being used in the position code. This latter fact can, however, be used to determine the rotational position of the partial surface. If the next bit in the bit series is added to the four-bit sequence, a five-bit sequence is obtained. The fifth bit is obtained by reading the adjacent bit immediately outside the partial surface being used. Such an additional bit is usually easily available.

The partial surface which is read by the sensor can have four different rotational positions, rotated through 0, 90, 180 or 270 degrees relative to the code window. In those cases where the partial surface is rotated, the reading of the code will, however, be such that the code read inverted and reversed in either the x-direction or the y-direction or both, in comparison to if it had been read at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |
| 3 | 1 | 1 |
| 4 | 0 | 1 |

The above-mentioned five-bit sequence has the characteristic that it only occurs the right way round and not in inverted and reversed form in the seven-bit series apparent from the fact that the bit series (0 0 0 1 0 1 0) contains only two "ones". Therefore all five-bit sequences must contain at least three zeros, which after all five-after inversion (and any reversing) result in three ones, which cannot occur. Thus if a five-bit sequence is found which does not have a position number in the bit series, it can be concluded that the partial surface should probably be rotated and the new position tested.

In order to further illustrate of the invention according to this embodiment, here follows a specific example which is based on the described embodiment of the position code.

FIG. 6 shows an example of an image with 4*4 marks which is read by a device for position determination. These 4*4 marks have the following values:

```
4 4 4 2
3 2 3 4
4 4 2 4
1 3 2 4
```

These values represent the following binary x- and codes:

| x-codes | y-codes |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical bit sequences in the x-code code the following positions in the bit series: 2 0 4 6. The differences between the columns are -2 4 2, which modulo 7 gives: 5 4 2, which in mixed base codes the position number of the code window: $(5-3)*8+(4-3)*2+(2-1)=16+2+1=19$. The first coded code window has the position number 0. Thus the difference which lies in the range 1 to 2 and which appears in the 4*4 marks of the partial surface is the twentieth such difference. As additionally there are in total three columns for each such difference and there is a start column, the vertical sequence furthest to the right in the 4*4 x-code belongs to the 61st column (column 60) in the x-code (3* 20+1=61) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is these values minus 57 modulo 7, which gives the start positions 6 3 0 2. Converted to digits in mixed base, this becomes 6-2, 3-2, 0-0, 2-2=4 1 0 0, where the third digit is the least significant digit in the number concerned. The fourth digit is then the most significant digit in the next number. It must in this case be the same as in the number concerned. (The exception is when the number concerned consists of the highest possible digits in all positions. Then it is known that the commencement of the next number is one greater than the commencement of the number concerned.) The position number is in mixed base 0*50+ 4*10+1*2+0*1=42.

The third horizontal bit sequence in the y-code thus belongs to the 43rd code window which has a start position 0 or 1, and as there are four rows in total for each such code window, the third row is number 43*4=172.

In this example, the position of the top left corner of the partial surface with 4*4 marks is (58,170). As the vertical bit sequences in the x-code in the 4*4 group start at row 170, the whole pattern's x-columns start in the number series' positions ((2 0 4 6) -169) mod 7=1 6 3 5. Between the last start position (5) and the first start position the numbers 0–19 are coded in mixed base, and by adding the representations of the numbers 0–19 in mixed base the total difference between these columns is obtained. A primitive algorithm for doing this is to generate these twenty numbers and directly add their digits. Call the sum obtained s. The page or writing surface is then given by (5-s)modulo7.

An alternative method for determining which bit is the least significant in a partial surface, in order to be able to identify a code window in this way, is as follows. The least significant bit (LSB) is defined as the digit which is the lowest in a partial surface's differences or row position numbers. In this way, the reduction (redundancy) of the maximum useable number of coordinates is relatively small. For example, the first code windows in the x-direction in the example above can all have LSB=1 and the other digits between 2 and 6, which gives 25 code windows, the next can have LSB=2 and the other digits between 3 and 6, which gives 16 code windows, the next can have LSB=3 and the other digits between 4 and 6, which gives 9 code windows, the next can have LSB=4 and the other digits between 5 and 6, which gives 4 code windows, the next can have LSB=5 and the other digits 6, which gives 1 code window, that is a total of 55 code windows, compared to 32 in the example above.

In the example above, an embodiment has been described where each code window is coded by 4*4 marks and a number series with 7 bits is used. This is, of course, only one example. Positions can be coded by more or fewer marks. There does not need to be the same number in both directions. The number series can be of different length and does not need to be binary, but can be based on a different base, for example hex code. Different number series can be used for coding in the x-direction and coding in the y-direction. The marks can represent different numbers of values. The coding in the y-direction can also be carried out by differences.

In a practical example, a partial surface is used consisting of 6*6 marks and where the bit series as a maximum could consist of $2^6$ bits, that is 64 bits. However, a bit series consisting of 51 bits is used, and consequently 51 positions, in order to have the ability to determine the rotational position of the partial surface. An example of such a bit series is:

0 0 0 0 1 1 0 0 0 1 1 1 1 1 0 1 0 1 0 1 1 0 1 1 0 0 1 1
0 1 0 0 0 1 0 1 0 0 1 1 1 0 1 1 1 1 0 0 1 0

Such a partial surface consisting of six by six marks can code $4^{6*6}$ positions, which with the said raster dimensions of 0.3 mm is an extremely large surface.

In a similar way as described above for the seven-bit series, according to this invention the characteristic is utilized that the partial surface is enlarged to include one bit on each side of the partial surface, at least at its center, so that for the third and fourth rows in the partial surface of 6*6 symbols, 8 symbols are read, one on each side of the partial surface, and similarly in the y-direction. The above-mentioned bit series which contains 51 bits has the characteristic that a bit sequence of 6 bits occurs only once and that a bit sequence of 8 bits which contains the above-mentioned bit sequence of 6 bits occurs only once and never in an inverted position or reversed and inverted. In this way, the rotational position of the partial surface can be determined by reading 8 bits in row 3, row 4, column 3 and/or column 4. When the rotational position is known, the partial surface can be rotated to the correct position before the processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 5*a* to 5*d*. In order to increase the randomness further or avoid repetitive characteristics, a method can be used which is called "shuffle". Each bit sequence in a code window starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 4 is "spiky".

In the example above, with a 4*4 code window the displacement vector can be 1, 2, 4, 0 for LSB=0 and 2, 2, 3, 0 for LSB=1. This means that after subtracting the numbers 2 and 0 respectively, the above displacement is to be subtracted (modulo five) from the bit sequence's position number, before the calculation continues. In the example above, for the y-coordinate the digits 4 1 0 0 ($S_2$, $S_1$, $S_0$, $S_4$) are obtained in mixed base, where the second digit from the right is the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also have other arrangements, such as along the raster lines in a raster with 60 degree angles, etc. A polar coordinate system can also be used.

Rasters in the form of triangles or hexagons can also be used. For example, a raster with triangles enables each mark to be displaced in six different directions, which provides even greater possibilities, corresponding to $6^{6*6}$ partial surface positions. For a hexagonal raster, a honeycomb pattern, each mark can be displaced in three different directions along the raster lines.

As mentioned above, the marks do not need to be displaced along the raster lines but can be displaced in other directions, for example in order to be located each in a separate quadrant of a square raster pattern. In the hexagonal raster pattern the marks can be displaced in four or more different directions, for example in six directions along the raster lines and along lines which are at 60 degrees to the raster lines.

In order for the position code to be detected, it is necessary for the virtual raster to be determined. This can be carried out, in a square raster pattern, by examining the distance between the different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 μm along the raster lines, which are a distance of 300 μm apart, the least distance between two marks will be 200 μm, for example between marks with the values 1 and 3. The next smallest distance arises between, for example, marks with the values 1 and 2, and is 255 μm. There is therefore a relatively distinct difference between the least and the next smallest distance. Also the difference to any diagonals is great. However, if the displacement is larger than 50 μm, for example more than 75 μm (¼), diagonals can cause problems and it can be difficult to determine to which nominal position a mark belongs. If the displacement is less than 50 μm, for example less than approximately 35 μm (⅛), the least distance will be 230 μm, which does not give a very large difference to the next distance, which is then 267 μm. In addition, the demands on the optical reading increase.

The marks should not cover their own raster point and should therefore not have a larger diameter than twice the displacement, that is 200%. This is, however, not critical, and a certain overlapping can be permitted, for example 240%. The least size is determined initially by the resolution of the sensor and the demands of the printing process used to reproduce the pattern. However, the marks should not have a smaller diameter than approximately 50% of the displacement in practice, in order to avoid problems with particles and noise in the sensor.

In the embodiment above, the raster is an orthogonal grid. It can also have other forms, such as a rhombic grid, for example with 60 degree angles, a triangular or hexagonal grid, etc.

Displacement in more or less than four directions can be used, for example displacement in three directions along a hexagonal virtual raster. In an orthogonal raster only two displacements can be used, in order to facilitate the recreation of the raster. However, a displacement in four directions is preferred, but six or eight directions are also possible.

In the embodiment above, the longest possible cyclic number series is not used. Thus a degree of redundancy is obtained, which can be used in various ways, for example to carry out error correcting, replace missing or hidden marks, etc.

What we claim and desire to secure by Letters Patent is:

1. A product comprising at least one authentication writing area which is adapted to receive handwritten authentication information from a user and which is provided with a specifically assigned personal subset of an absolute position-coding pattern, which codes coordinates for a plurality of points on an imaginary surface, said subset allowing digital recording and reproduction of the handwritten authentication information as well as authenticity checking.

2. A product comprising at least one authentication writing area which is adapted to receive handwritten authentication information from a user and which is provided with a specifically assigned subset of an absolute position-coding pattern, which codes coordinates for a plurality of points on an imaginary surface, said subset allowing digital recording and reproduction of the handwritten authentication information as well as authenticity checking, wherein the subset of the absolute position-coding pattern is unique to an authorized user.

3. A product according to claim 2, in which the first position-coding pattern is constructed of a plurality of symbols, each point's coordinates being coded by a plurality of symbols and each symbol contributing to the coding of more than one point.

4. A product according to claim 2, in which the subset of the absolute position-coding pattern is unique to each item of the product.

5. A product according to claim 2, in which the handwritten information comprises the user's signature.

6. A product according to claim 5, which product comprises a plurality of further writing areas, which are adapted to receive additional handwritten information which is related to the product, which further writing areas are provided with position-coding patterns which make possible digital recording of the additional handwritten information.

7. A product according to claim 2, which product is a payment product.

8. A product according to claim 7, which product is a cheque.

9. A product comprising at least one authentication writing area which is adapted to receive handwritten authentication information from a user and which is provided with a specifically assigned subset of an absolute position-coding pattern, which codes coordinates For a plurality of points on an imaginary surface, said subset allowing digital recording and reproduction of the handwritten authentication information as well as authenticity checking, wherein the subset of the absolute position-coding pattern is unique to one type of product.

10. A product according to claim 9, in which the absolute position-coding pattern is constructed of a plurality of symbols, each point's coordinates being coded by a plurality of symbols and each symbol contributing to the coding of more than one point.

11. A product according to claim 9, in which the subset of the absolute position-coding pattern is unique to each item of the product.

12. A product according to claim 9, in which the handwritten information comprises the user's signature.

13. A product according to claim 12, which product comprises a plurality of further writing areas, which are adapted to receive additional handwritten information which is related to the product, which further writing areas are provided with position-coding patterns which make possible digital recording of the additional handwritten information.

14. A product according to claim 7, which product is a payment product.

15. A product according to claim 14, which product is a cheque.

16. A server unit for managing information, which server unit is arranged to receive pen stroke information from a plurality of digital pens and which server unit has access to a memory, in which there is stored information about a plurality of regions, each of which represents a coordinate area on at least one imaginary surface,
   wherein the server unit is arranged to receive the pen stroke information in the form of at least two coordinates for at least one point on the imaginary surface, and wherein
   the server unit is arranged, in response to the receipt of the pen stroke information from one of said digital pens, to determine to which coordinate area the coordinates belong and to carry out an authenticity check on the basis of the coordinate area to which the coordinates belong,
   wherein at least one authorized user is associated with at least certain of the regions and in which the server unit is arranged when carrying out the authenticity check to check the authorization of the user by means of a region affiliation.

17. A server unit according to claim 16, in which at least one unique digital pen identity, which identifies the digital pen which is authorized to record coordinates for points within the region, is associated with at least certain of the regions, said pen stroke information comprising the digital pen identity and the server unit being arranged when carrying out the authenticity check to use the digital pen identity to check the authorization of the user.

18. A server unit according to claim 16, in which a signature of the authorized user of the region is associated with at least certain of the regions, said pen stroke information comprising a digital representation of a user's signature and the server unit being arranged when carrying out the authenticity check to compare the signature in the received information with the signature associated with the region concerned.

19. A server unit according to claim 16, in which the memory further stores rules for the regions, said rules defining how the information associated with the regions should be processed.

20. A server unit according to claim 16, in which the server unit is arranged to forward information to a recipient.

21. A server unit according to claim 20, in which the recipient is determined by the region affiliation.

22. A server unit according to claim 21, in which the server unit is arranged to include information concerning the region affiliation in the information which is sent to the recipient.

23. A server unit according to claim 16, in which the server unit is arranged to be incorporated in a system for electronic payment and in which said information is payment information.

24. A system for managing information, which system comprises a server unit and a plurality of digital pens, each of which is arranged to record and send pen stroke information to the server unit, wherein information is stored in the server unit concerning a plurality of regions, each of which represents a coordinate area on at least one imaginary surface, each of the digital pens is arranged to record the pen stroke information in the form of at least two coordinates for at least one point on the imaginary surface, and the server unit is arranged, in response to the receipt of the pen stroke information from one of said digital pens, to determine to which coordinate area the coordinates belong and to carry out an authenticity check on the basis of the coordinate area to which the coordinates belong, wherein at least one authorized user is associated with at least certain of the regions and in which the server unit is arranged to check the user's authorization by means of a region affiliation when carrying out the authenticity check.

25. A system according to claim 24, in which the digital pen is arranged to include a unique digital pen identity which is included in the pen stroke information to the server unit, and in which the server unit is arranged to use the digital pen identity to check the user's authorization when carrying out the authenticity check.

26. A system according to claim 24, in which a signature of the authorized user of the region is associated with at least certain of the regions, said pen stroke information comprising a digital representation of a user's signature and the server unit being arranged to compare the signature in the received information with the signature associated with the region concerned when carrying out the authenticity check.

27. A system according to claim 24, in which the server unit is arranged to forward information to a recipient.

28. A system according to claim 27, in which the recipient is determined by the region affiliation.

29. A system according to claim 27, in which the server unit is arranged to include information concerning the region affiliation in the information which is sent to the recipient.

30. A system according to claim 27, in which at least one authorized user is associated with each region and in which the server unit is arranged to check the authorization of the user by means of the region affiliation and in which the server unit is arranged to include information concerning the user's authorization in the information which is sent to the recipient.

31. A system according to claim 24, in which said plurality of digital pens are arranged to record a signature electronically for a user, the recording being carried out in the form of coordinates which are read from a product on which the user writes his signature and the information which is sent to the server unit comprising at least certain of the read-off coordinates.

32. A system according to claim 31, in which the server unit is arranged to compare the signature received from the digital pen with a previously-stored signature of the authorized user and to include information concerning the authenticity of the signature in the information which is sent to the recipient.

33. A system according to claim 24, in which the system is a system for electronic payment and in which the pen stroke information which is received from the digital pen is payment information.

34. A system according to claim 24, wherein at least one of the digital pens stores an account number.

35. A method of providing a product which makes possible checking of a user's authorization to use the product, comprising:

selecting a specific subset of an absolute position-coding pattern and applying the specific subset in an authentication area on the product, wherein the subset of the absolute position-coding pattern is selected so that the subset is unique to the authorized user.

36. A method according to claim 35, in which the subset of the absolute position-coding pattern is selected so that the subset is unique to the item of the product.

37. A method of providing a product which makes possible checking of a user's authorization to use the product, comprising:

selecting a specific subset of an absolute position-coding pattern and applying the specific subset in an authentication area on the product, and further comprising storing information about a coordinate area which is coded by the specific subset of the absolute position-coding pattern, so that the information can be checked when checking the user's authorization to use the product.

38. A method according to claim 37, in which the subset of the absolute position-coding pattern is selected so that the subset is unique to the item of the product.

39. A method of checking a user's authorization to use a product, comprising receiving at least two coordinates from a digital pen, which has decoded the coordinates from an absolute position-coding pattern on the product, which absolute position-coding pattern codes coordinates for a plurality of points on an imaginary surface, wherein the user is provided with a specifically assigned personal coordinate area of the absolute position-coding pattern, said personal coordinate area allowing digital recording and reproduction of the handwritten authentication information as well as authenticity checking; determining to which coordinate area of a plurality of coordinate areas the received coordinates belong; and determining the user's authorization based on the determined coordinate area.

* * * * *